United States Patent [19]

Penha

[11] Patent Number: 4,747,459
[45] Date of Patent: May 31, 1988

[54] HOVERCRAFT

[76] Inventor: Edison Penha, P.O. Box 477, 14075 Ribeirao Preto, Brazil

[21] Appl. No.: 21,692

[22] Filed: Mar. 4, 1987

[51] Int. Cl.$^4$ ................................................ B60V 1/04
[52] U.S. Cl. ................................... 180/120; 180/121; 180/333
[58] Field of Search ............... 180/120, 117, 121, 127, 180/6.48, 333

[56] References Cited

U.S. PATENT DOCUMENTS

| | | | |
|---|---|---|---|
| 3,267,898 | 8/1966 | Evans | 180/120 |
| 3,401,766 | 9/1968 | Laufman et al. | 180/120 |
| 3,467,213 | 9/1969 | Walker | 180/120 |
| 3,486,577 | 12/1969 | Jackes | 180/120 |

Primary Examiner—John J. Love
Assistant Examiner—Donn McGiehan
Attorney, Agent, or Firm—Ostrolenk, Faber, Gerb & Soffen

[57] ABSTRACT

A hovercraft includes a rigid body and a flexible skirt pending from a lower periphery thereof. A main engine and propeller are coupled to the rigid body and provide a main propeller thrust. A plurality of thrust control vanes are located downstream of the propeller and divide the main propeller thrust into a horizontal thrust component directed rearwardly of the thrust control vanes and a vertical thrust component directed to a location under the rigid body so as to cooperate with the flexible skirt to form an air cushion on which the hovercraft rides. A plurality of steering control vanes are located downstream of the thrust control vanes and control the forward direction of the hovercraft. A single control stick controls the operation of both the thrust control vanes and the steering control vanes.

7 Claims, 8 Drawing Sheets

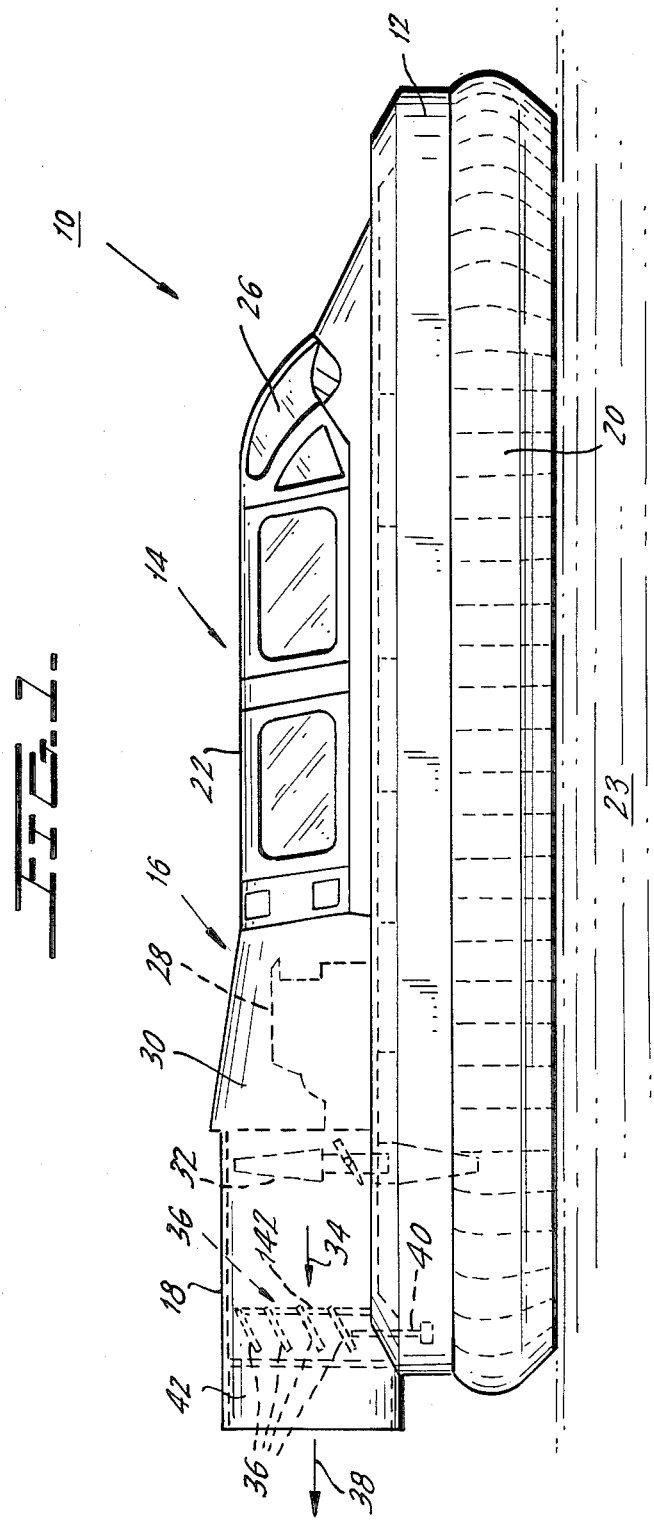

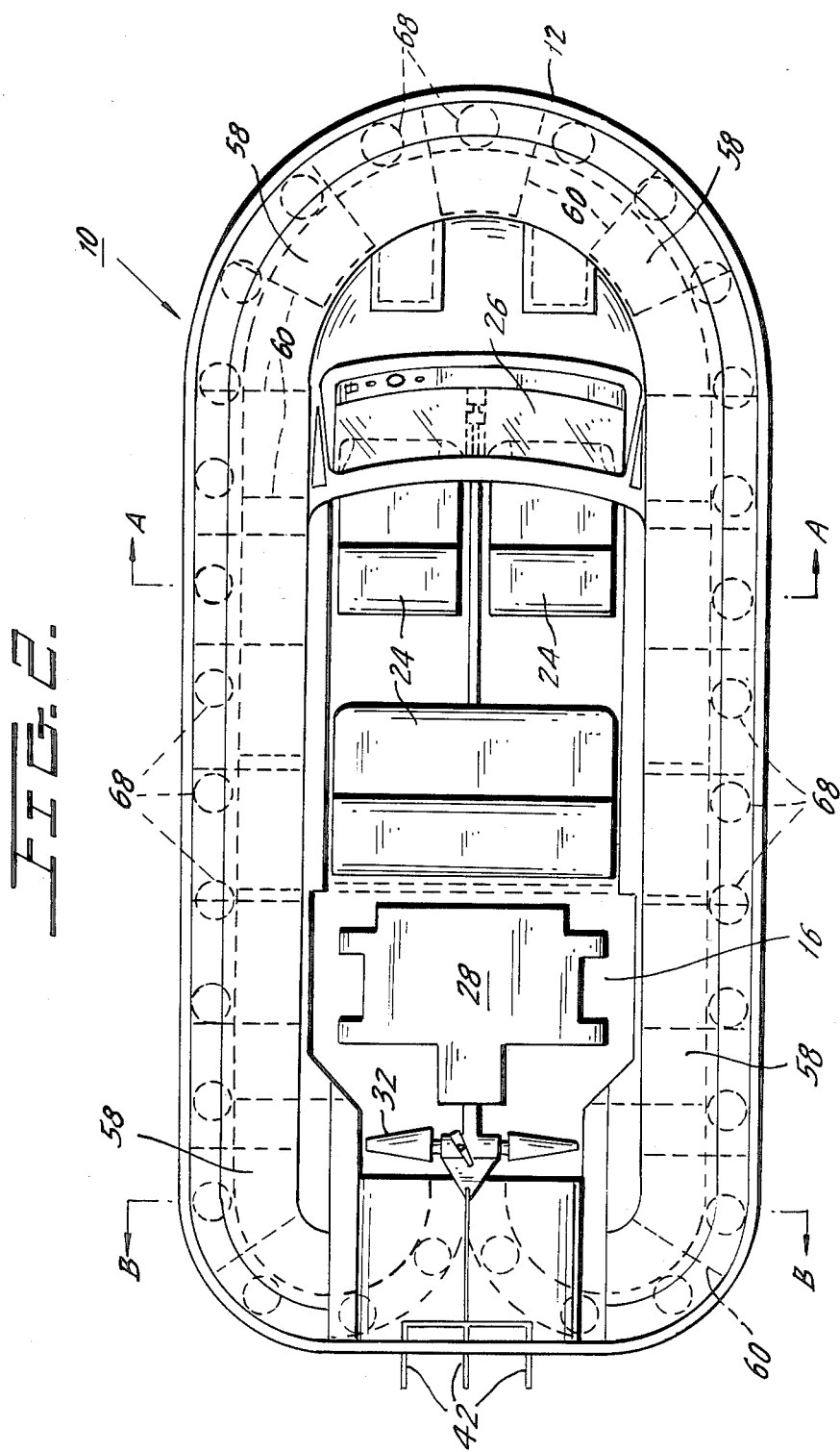

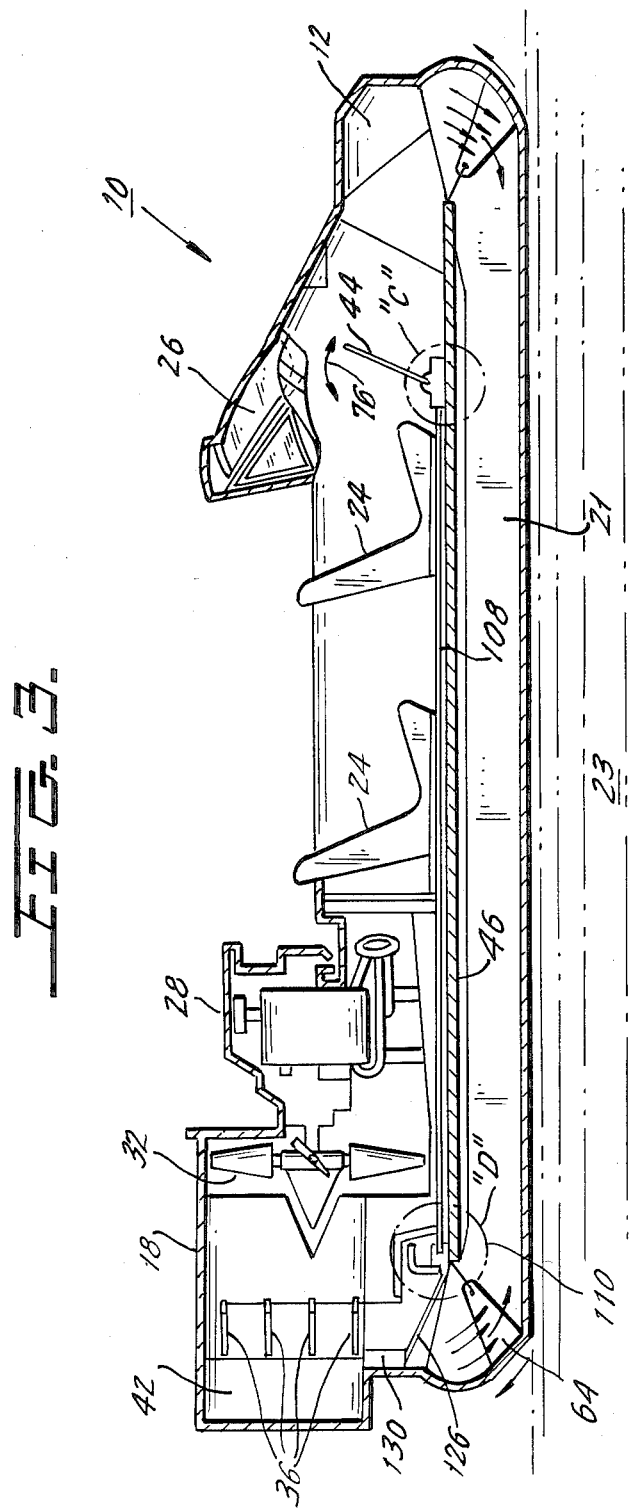

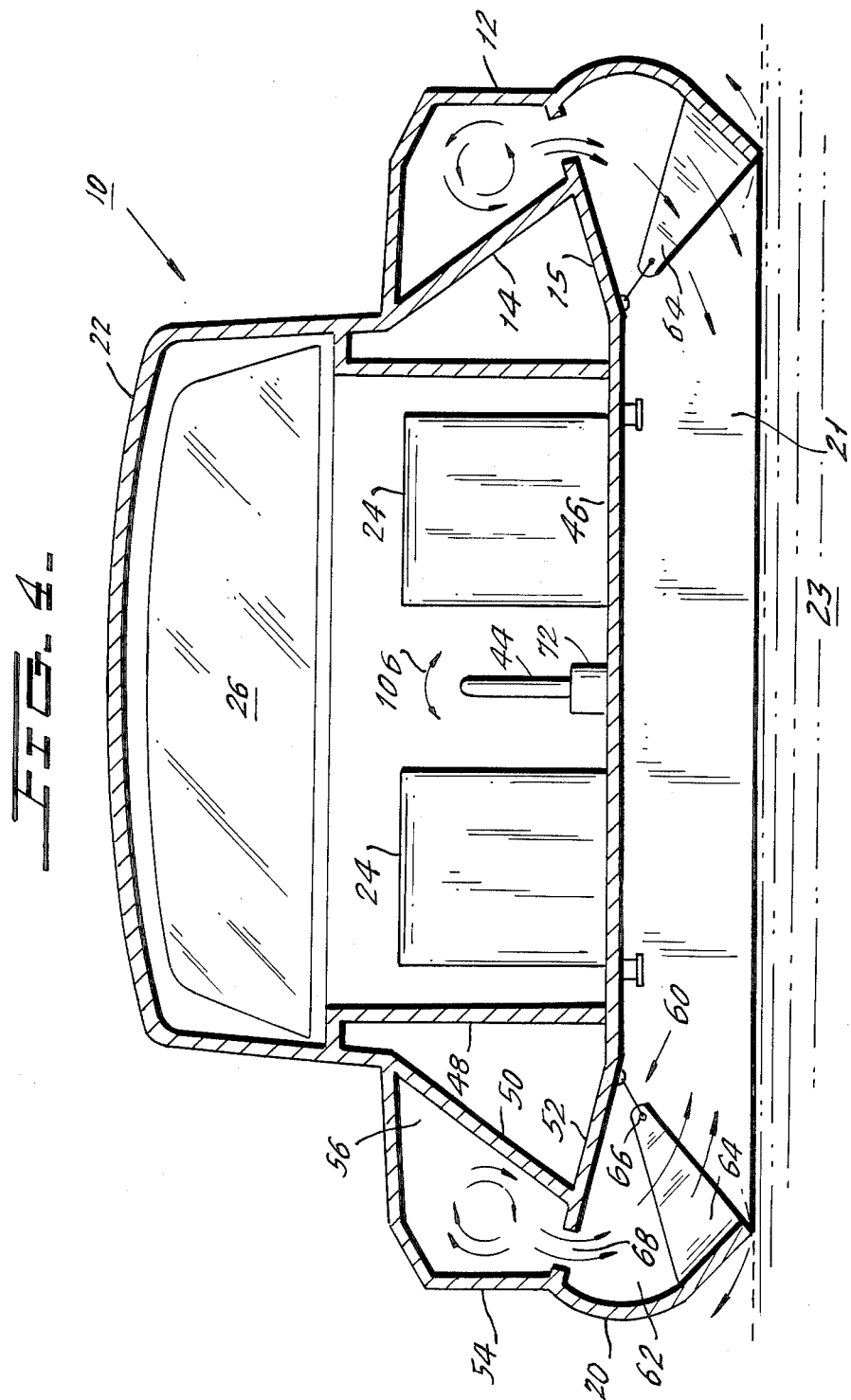

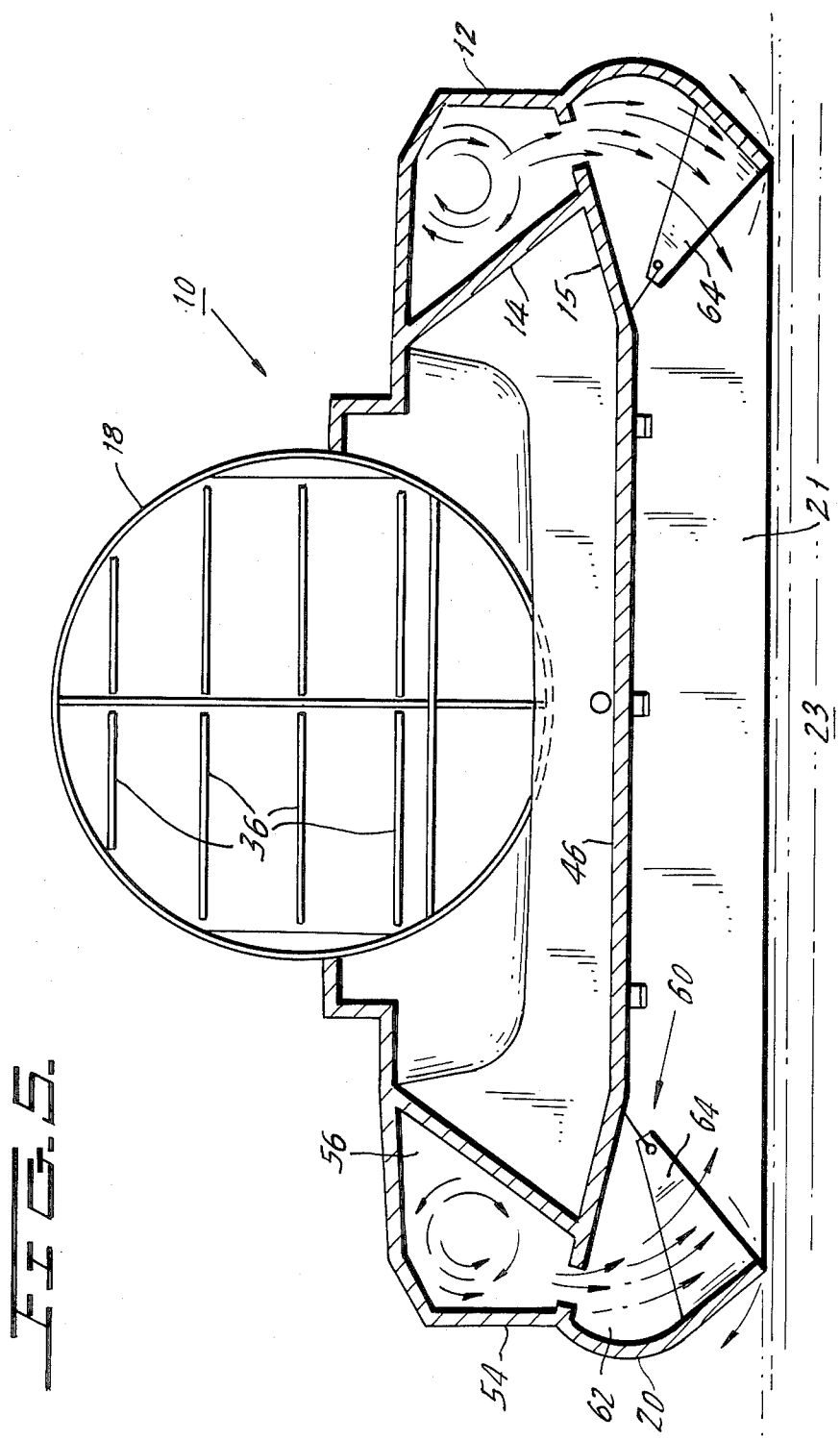

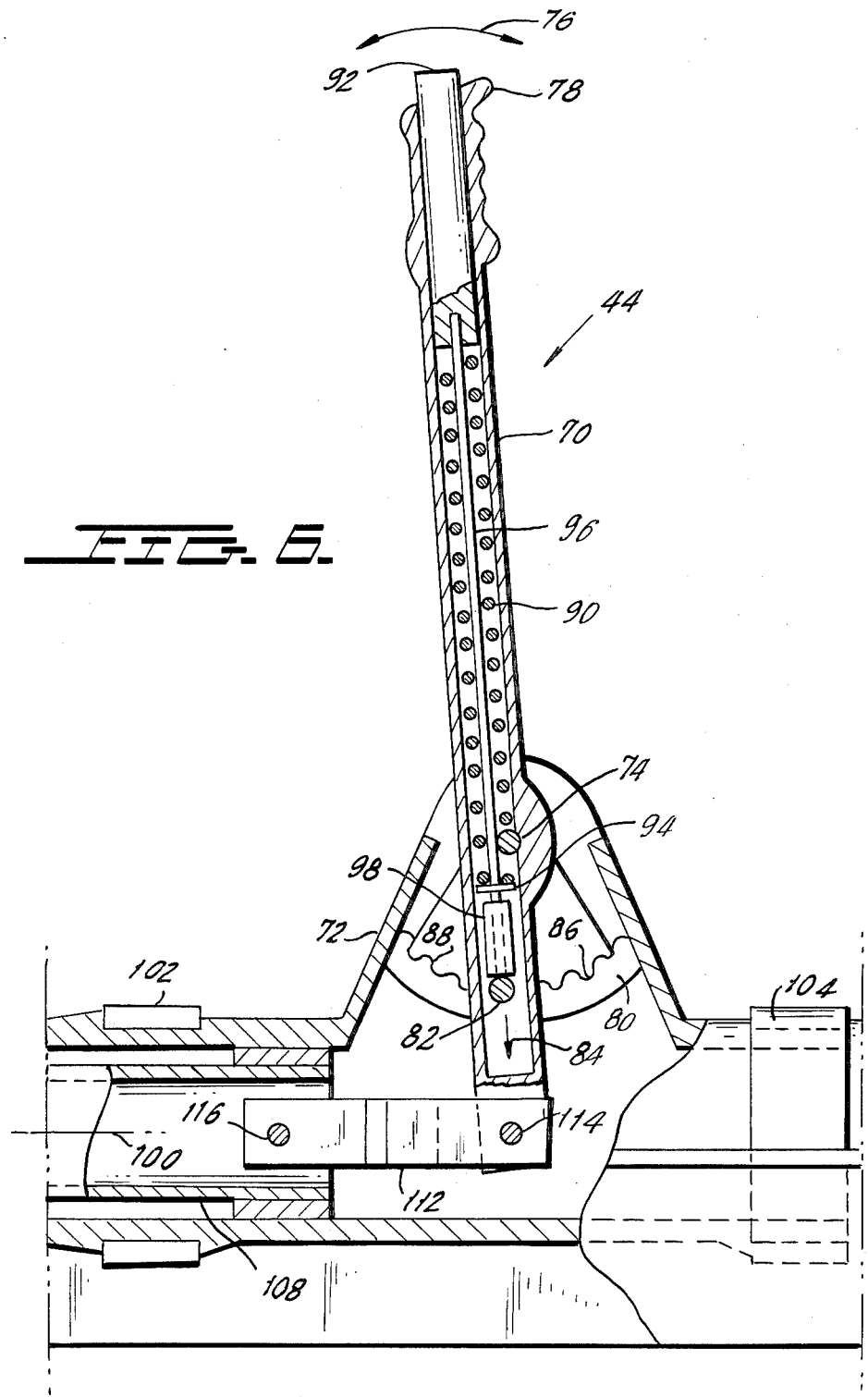

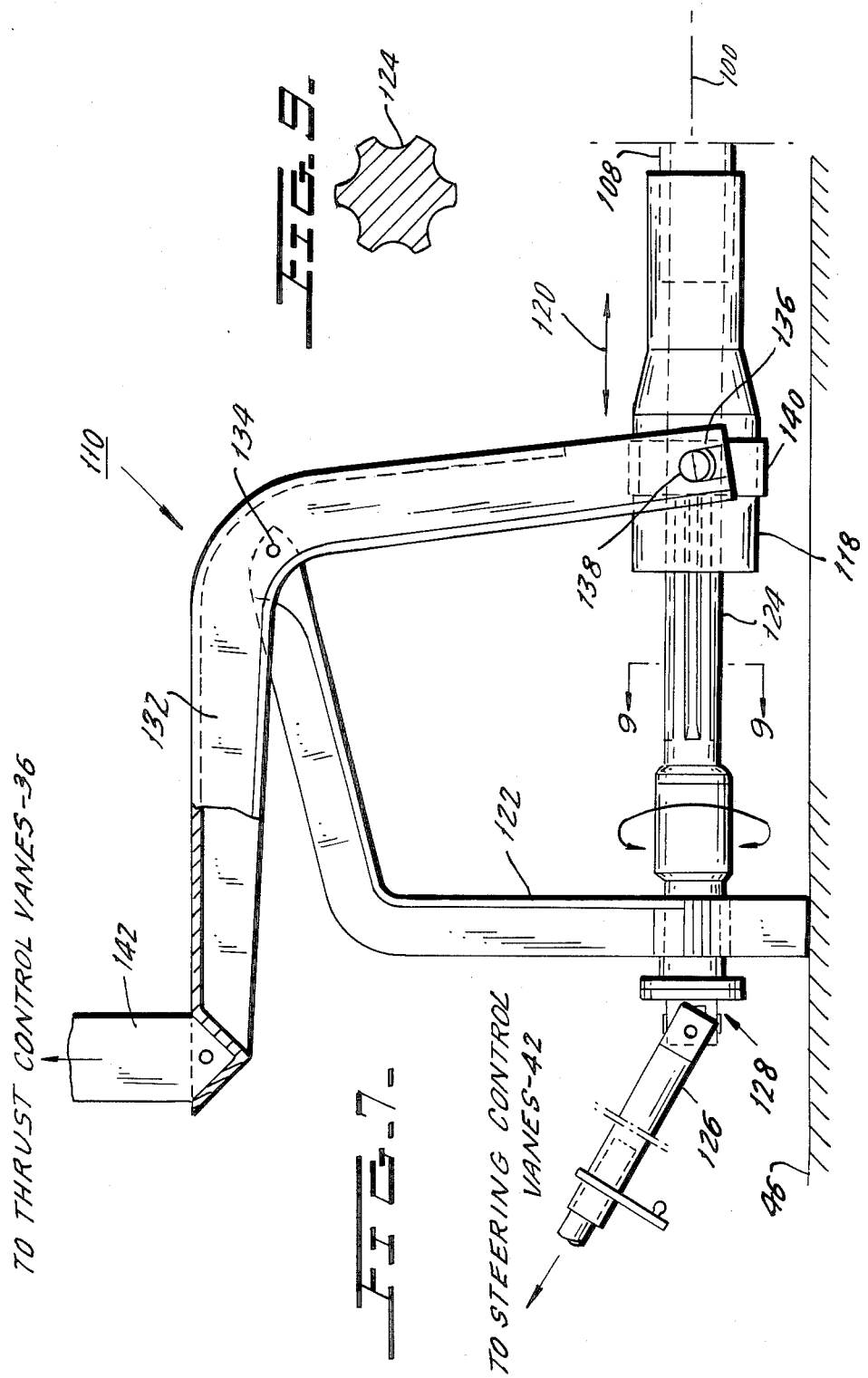

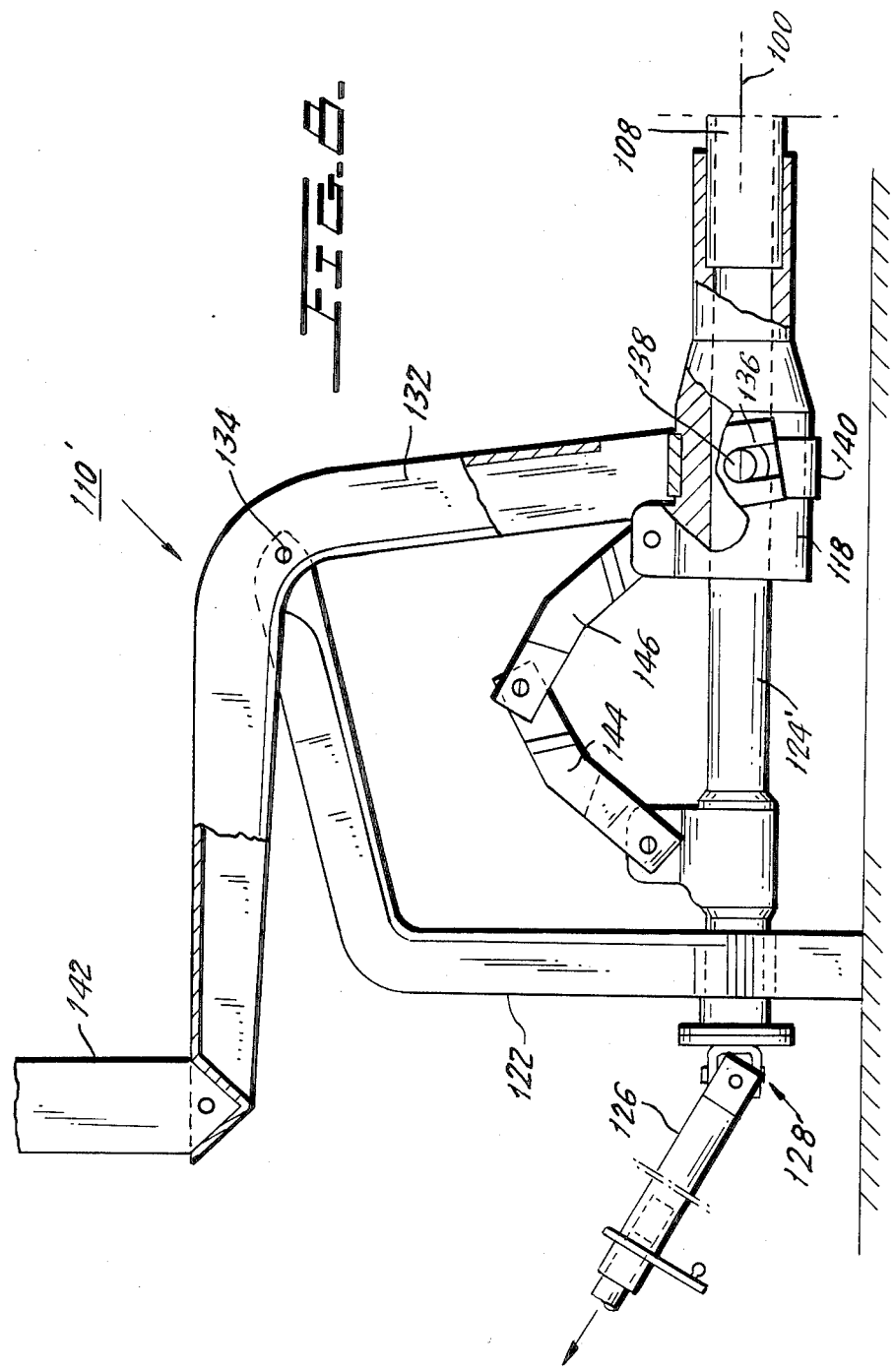

HOVERCRAFT

BACKGROUND OF THE INVENTION

The present invention is directed towards improvements in hovercrafts; vehicles which hover above the ground on a cushion of air located below the rigid floor of the vehicle. As is well known, hovercrafts include a flexible skirt located around the lower periphery of the craft which is filled with air by a propeller located internally of the craft. The air within the skirt forms a shock absorbing air cushion which maintains the vehicle above the ground making it capable of moving over different surface such as land, water, swamps, etc.

Most prior art hovercraft utilize two engines: one to provide vertical thrust for the air cushion and the second to provide horizontal thrust for propelling the vehicle forward. The present invention is directed towards an improvement in a hovercraft of the type which utilizes a single engine to provide both the vertical thrust for the air cushion and the horizontal thrust for propelling the craft forward.

BRIEF DESCRIPTION OF THE INVENTION

In accordance with the present invention, a single set of thrust control vanes located rearwardly of the main propeller is utilized to split the main propeller thrust of the propeller into vertical and horizontal thrust components. The horizontal thrust components are directed out the rear of the hovercraft and propels the hovercraft forward. The vertical thrust component is directed below the rigid floor of the hovercraft and is contained by the flexible skirt to form a shock absorbing air cushion. By controlling the angle of the thrust control vanes, the ratio of horizontal to vertical thrust components can be controlled to accommodate varying operating conditions. When an increased vertical thrust is required, the control vanes are moved so as to increase the percentage of the main propeller thrust which is diverted to the area below the vehicle. Conversely, when relatively greater horizontal thrust is required, the thrust control vanes are moved to an angle which increases the ratio of horizontal to vertical thrust. Under normal conditions, as the speed of the hovercraft increases, the required vertical thrust decreases. Conversely, as the speed of the hovercraft decreases, the required vertical thrust increases. The present invention automatically accommodates this varying requirement since the thrust control vanes divide the total main propeller thrust between the vertical and horizontal thrust components (e.g., when the vertical thrust component is increased, the horizontal thrust component is automatically decreased and vice versa).

The hovercraft also includes a set of steering control vanes which define a rudder which controls the steering of the craft. The steering control vanes are located rearwardly of the thrust control vanes and receive the horizontal thrust component of the main propeller thrust. In accordance with the preferred embodiment of the present invention, a single control stick is utilized to control both the of the thrust control vanes and the steering control vanes. This simplifies the structure and operation of the hovercraft.

In accordance with the present invention, the hovercraft comprises:
a rigid body;
a flexible skirt depending from a lower periphery of said rigid body;
a main engine and propeller for generating a main propeller thrust;
at least one thrust control vane located downstream of said propeller for dividing said main propeller thrust into horizontal thrust component directed rearwardly of said at least one thrust control vane and a vertical thrust component directed to a location under said rigid body so as to cooperate with said flexible skirt to form an air cushion on which said hovercraft rides;
at least one steering control vane located downstream of said at least one thrust control vane for controlling the forward direction of said hovercraft;
a single control stick; and
means responsive to said control stick for controlling both said at least one thrust control vane and said at least one steering control vane.

BRIEF DESCRIPTION OF THE DRAWINGS

For the purpose of illustrating the invention, there is shown in the drawings several forms which are presently preferred, it being understood, however, that the invention is not limited to the precise arrangements and instrumentality shown.

FIG. 1 is a side elevational view of a hovercraft constructed in accordance with the principles of the present invention;

FIG. 2 is a schematic plan view of the hovercraft of FIG. 1;

FIG. 3 is a longitudinal schematic view, partially broken, of the hovercraft of FIG. 1;

FIG. 4 is a sectional view taken along line A—A of FIG. 2;

FIG. 5 is a sectional view taken along line B—B of FIG. 2;

FIG. 6 is a detailed view of the area "C" of FIG. 3;

FIG. 7 is a detailed view of the area "D" of FIG. 3;

FIG. 8 illustrates and alternative structure of the mechanical transmission mechanism of FIG. 7; and FIG. 9 is a cross-sectional view of the profile of the furrowed axle taken along line E—E of FIG. 7.

DETAILED DESCRIPTION OF THE INVENTION

Referring now to the drawings where like numerals indicate like elements, there is shown in FIGS. 1-5 a hovercraft constructed in accordance with the principles of the presen invention and designated generally as 10. Hovercraft 10 includes a rigid hull 12 preferably molded of a rigid plastic material which is reinforced by fiberglass meshes. The hull 12 includes a passenger compartment 14, an engine compartment 16 and a thrust compartment 18. A flexible skirt 20 depends from the bottom periphery of hull 12 and, in cooperation with the thrust propeller 32 forms an air cushion 21 (FIG. 4) which maintains the hull 12 above the surface 23 over which the hovercraft 10 is riding.

The passenger compartment 14 is covered by a removable hood 22 (compare FIGS. 1 and 3) and includes a plurality of seats 24 located rearwardly of a windshield 26. The engine compartment 16 is located rearwardly of the passenger compartment 14 and housing engine 28.

The engine 28 is covered by an open meshed grille 30. When the engine 28 requires servicing, the grille 30 can be slid into a position over the passenger compartment 14 after the hood 22 has been removed.

The engine 28 drives a propeller 32 which is preferably a 3-blade propeller and which provides the main engine thrust indicated by arrow 34. This thrust is directed rearwardly of the hovercraft 10 to the thrust control vanes 36 which divide the main engine thrust 34 into a horizontal thrust component indicated by arrow 38 and a vertical thrust component indicated by arrow 40. The horizontal thrust component 38 is directed rearwardly out the back of the hovercraft 10 past a plurality of steering control vanes 42 which control the forward direction of the craft. The vertical thrust component is directed below the hull 12 to the area of the flexible skirt 20 via an air distribution network which is best shown in FIGS. 2 and 4.

As shown in FIG. 4, the hull 12 includes a plurality of walls 48–52 which cooperate to define watertight chamber 54. The watertight chamber 54 cooperates with the floor 46 to define a watertight hull which encompasses the passenger, engine and thrust compartments 14–18 and ensures that the hovercraft 10 floats even if the air cushion 21 fails. The air distribution network is located outside of the watertight chamber 54 and serves to distribute the vertical thrust component of the main engine thrust from the rearward position adjacent the thrust control vanes 36 throughout the lower periphery of the hovercraft 10 so as to provide a fairly even air flow to all areas of the flexible skirt 20. The main component of the air distribution network is an air distribution chamber 56 defined by walls 50, 52 and 54. This chamber extends around substantially the entire periphery of the hovercraft 10.

A plurality of localized air chambers 54 are located below the air distribution chamber 56 along substantially the entire periphery of the hovercraft 10. The air chambers 54 are each defined by a respective pair of adjacent vertical dividers 60. Each divider 60 includes a stationary portion 62 and a pivoting portion 64 depending therefrom. The pivoting portion 64 is pivotally connected to the stationary portion 62 by an appropriate pivot joint 66. The flexible skirt 20 extends around the outer peripheries of the vertical dividers 60 and is maintained in the desired arcuate configuration by the arcuate periphery of the dividers 60. The portion 64 is pivotally connected to the stationary portion 62 to accommodate for variations in the surface 23 as the hovercraft 10 moves over the surface 23.

The vertical thrust component of the main engine thrust is distributed from the air distribution chamber 26 to the localized air chambers 58 via a plurality of circular openings 68, at least one opening 68 being provided for each air chamber 58. The vertical thrust component of the main engine thrust 34 is directed by the localized air chambers 58 into the area below the floor 56 so as to form the air cushion 21 and maintain the floor 56 above the surface 23.

The thrust control vanes 36 (shown schematically in the figures) include a plurality of horizontally oriented vanes which are pivotable along respective horizontal axes extending into FIG. 1 of the drawings. The angle of these blades is controlled by the movement of a connector rod 142 whose operation is described below. The angle of the individual vanes of the thrust control vanes 36 determines the ratio of the horizontal to vertical thrust components. The individual vanes of thrust control vanes 36 are moved together in response to the vertical movement of connector rod 142 in response to the forward and rear movement of control stick 44 as viewed in FIG. 3.

The steering control vanes 42 (shown schematically in the figures) are pivotal along respective vertical axes. The angular orientation of the individual steering control vanes 42 determines the forward direction of the hovercraft 10. These vanes are coupled to a gear box 130 shown schematically in FIG. 3 which rotates the individual control vanes 42 as a unit about their respective vertical pivoting axes. As will be described below, the gear box 130 controls the angular orientation of steering control vanes 42 in response to the left-to-right movement of control stick 44 as viewed in FIG. 4.

The control stick 44, which controls the angular orientation of both the thrust control vanes 36 and the steering control vanes 42, is located in the passenger compartment 14 adjacent the forward driver's seat 24.

The preferred structure of control stick 44 is illustrated in FIG. 6. As shown therein, control stick 44 includes a hollow tubular shaft 70 which is pivoted to a control stick housing 72 by pivot joint 74. As a result of this connection, control stick 44 can be moved forward and back along an arc indicated by arrow 76 by the operator of hovercraft 10. Under normal operating conditions, the desired ratio of vertical to horizontal thrust is stable for relatively long periods of time. For this reason, it is desirable to maintain the angular position of the thrust control vanes 36 at a desired position until conditions significantly change. To this end, means are provided for locking the control stick 44, and therefore the thrust control vanes 36, in a desired angular position until the operator of the hovercraft wishes to change that position. The locking means includes an internally toothed gear 80 and a locking pin 82 located near the lower end of the tubular shaft 70. The locking pin 82 is normally biased downwardly in the direction of arrow 84 and is driven into one of the depressions 86 located between adjacent teeth 88 of gear 80 thereby locking the tubular shaft 70 in place. The locking pin 82 is biased in the downward direction indicated by arrow 84 through the cooperation of compression spring 90, push-button 92, stop 94, shaft 96 and reversal mechanism 98. The compression spring 90 is located within the hollow tubular shaft 70 between a push-button 92 and internal stop 94. The push-button 92 is movable between an uppermost position illustrated in 56 and a lowermost position wherein the top of the pushbutton is flush with the top of the hand grip 78. The push-button 92 is coupled to the reversal mechanism 98 by a shaft 96 located internally of the compression spring 90. The compression spring 90 normally biases pushbutton 92 into the upper position illustrated in FIG. 6 which causes shaft 92 to assume its uppermost position. The reversal mechanism 98 (which can take any known form) biases the locking pin 82 downwardly whenever the central shaft 96 is lifted into its uppermost position by compression spring 90. As a result, the locking pin 92 will normally be biased downwardly into one of the depressions 86, thereby locking the control stick 44 at the desired angular orientation.

The preferred ratio of horizontal to vertical thrust components is ⅔ to ⅓. For this reason, the control stick 44 will normally be locked in a position corresponding to this thrust ratio.

When the operator of hovercraft 10 wishes to change the angular orientation of control stick 44 along the arc indicated by arrow 76 so as to change the ratio of the horizontal to vertical thrust components, he depresses push-button 42 thereby moving central shaft 96 in a downward direction and causing reversal mechanism 98 to lift pin 82 out of the depression 86 and above the upper level of teeth 80. The operator may then pivot control stick 44 about pivot connection 74 to the desired angular orientation. Once the desired angular orientation (and thereby the desired horizontal and vertical thrust components) has been reached, the operator releases push-button 42 thereby locking control stick 44 in the desired angular orientation along the arc indicated by arrow 76.

While the tubular shaft 70 is pivotable about pivot joint 74, the entire control stick housing and tubular shaft 70 is pivotable about axis 100. To this end, the control stick housing 72 is journaled to an appropriate support structure (not shown) via roller bearings 102, 104 or other suitable means. As a result, the control stick 44 is rotatable about the arc indicated by arrow 106 of FIG. 4. As will shown further below, the angular position of control stick 44 along the arc indicated by arrow 106 determines the angular orientation of the steering control vanes 42 and thereby controls the forward direction of the hovercraft 10. While the angular position of control stick 44 along the arc indicated by arrow 76 (FIG. 6) is normally locked in place (since it is normally desirable to maintain the horizontal and vertical thrust components constant), the angular position of control stick 44 along arc indicated by arrow 106 (FIG. 4) is freely movable due to the need to be able to freely steer the craft in its forward direction.

The control stick 44 is coupled to the thrust and steering control vanes 36, 42 via a horizontal axle 108 (FIGS. 3 and 6) which extends substantially the entire length of the hovercraft 10 to the transmission mechanism 110 (FIG. 7). The forward end of the horizontal axle 108 (FIG. 6) is pivotally coupled to the bottom end of control stick 44 by a connector rod 112 which is pivotally connected to both the control stick 44 and the horizontal axle 108 by respective pivot joints 14, 116.

As shown in FIG. 7, the rear end of axle 108 is coupled to the transmission mechanism 110 located in the rear of the hovercraft (see FIG. 3). The axle 108 is coupled to a sleeve 118 which translates back and forth as shown by arrow 120 in response to forward and back movement of control stick 44 (along arc 76 of FIG. 6) and which rotates about axis 100 in response to the left and right movement (along arc 106 of FIG. 4) of the control stick 44. The transmission mechanism 110 responds to a back and forth movement of sleeve 118 along arrow 120 by causing the angular orientation of thrust control vanes 36 to rotate along their respective horizontal axes so as to control the ratio between the horizontal and vertical thrust components. The transmission mechanism 110 responds to the rotational movement of sleeve 118 about axis 100 to cause steering control vanes 42 to pivot about their respective vertical axes thereby controlling the forward direction of the hovercraft 10.

The transmission mechanism 110 includes a vertical support member 122 which rotatably supports a furrowed axle 124 which is coaxial with and rotatable with respect to axis 100. The furrowed profile of axle 124 is shown in FIG. 9 which is a cross-section along lines E—E of FIG. 7. Sleeve 118 has corresponding internal furrows (not shown) which permit sleeve 118 to slide axially with respect to furrowed axle 124 and to rotate with furrowed axle 124. As a result, any axial movement of sleeve 118 will have no effect on furrowed axle 124 but any rotational movement of sleeve 118 will cause a corresponding rotational movement in axle 124. As a result, the left and right movement of control stick 44 (along arc 106 of FIG. 4) causes axial rotation of furrowed axle 124. Furrowed axle 124 is coupled to connector rod 126 by a universal joint 128. The distal end of connector rod 142 is coupled to a gear box 130 (shown schematically in FIG. 3) which is in turn connected to the individual steering control vanes. Gear box 130 responds to the rotational movement of connector rod 126 by causing the individual steering control vanes to rotate about their respective vertical axes. As a result of this structure, the left and right movement of control stick 44 (along arc 106 of FIG. 4) causes the individual steering control vanes 42 to rotate about their respective vertical axes and thereby controls the forward direction of hovercraft 10.

Returning to FIG. 7, an angled connector bar 132 is pivotably coupled to the distal end of vertical support member 122 by a pivot joint 134 such that connector bar 132 acts as a fulcrum. The lower end of the fulcrum has a elongated recesses 136 which receives a pin 138 coupled to sleeve 140. The sleeve 140 is rotatably coupled to sleeve 118 and may, for example, take the form of a roller bearing. Means (not shown) is provided for ensuring that the sleeve 140 does not rotate with reference to the vertical support member 122 so as to maintain the pin 138 at the desired vertical orientation. Sleeve 118 is, however, free to rotate with respect to the sleeve 140 and therefore the pin 138.

The remaining end of connector bar 132 is pivotally connected to connector rod 142 which is in turn connected to the thrust control vanes 36. As connector bar 138 pivots clockwise and counterclockwise around the pivot joint 134, it causes connector rod 142 to move upwardly and downwardly, respectively, thereby causing thrust control vanes 36 to rotate counterclockwise and clockwise, respectively, about their respective vertical axes as viewed in FIG. 1.

Summarizing the foregoing, movement of control stick 144 about arc 176 (FIG. 6) will result in axial movement of sleeve 118 in the direction of arrows 120, will cause connector bar 132 to pivot about pivot pin 134 and will therefore cause thrust control vanes 36 to pivot about their respective vertical axes. Rotational movement of control stick 144 about arc 106 (FIG. 4) will cause rotational movement of sleeve 118 about axis 100 which will cause rotational movement of furrowed axle 124 and connector rod 126 thereby causing steering control vanes 42 to rotate about their respective vertical axes.

An alternative structure of transmission mechanism 110 is illustrated in FIG. 8 and designated as 110'. The only difference between these structures is that a smooth axle 124' is substituted for the furrowed axle 124 of FIG. 7 and the sleeve 128 is coupled to the smooth axle 124 by an articulated member formed by a pair of connector rods 144, 146 so as to ensure that rotational movement of sleeve 128 will result in rotational movement of axle 124'.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A hovercraft, comprising:

a rigid body; a flexible skirt depending from a lower periphery of said rigid body;

a main engine and propeller for generating a main propeller thrust;

at least one thrust control vane located downstream of said propeller for dividing said main propeller thrust into a horizontal thrust component directed rearwardly of said at least one thrust control vane and a vertical thrust component directed to a location under said rigid body so as to cooperate with said flexible skirt to form an air cushion on which said hovercraft rides;

an air distribution network which distributes said vertical thrust component to direct it to said location under said rigid body and distributes said vertical thrust component substantially equally along the entire periphery of said air cushion; said air distribution network includes an air chamber extending around substantially the entire periphery of said air cushion and a plurality of localized air chambers located below said air distribution chamber at respective locations along substantially the entire periphery of said air cushion;

at least one steering control vane located downstream of said at least one thrust control vane for controlling the forward direction of said hovercraft;

a single control stick; and means responsive to said control stick for controlling both said at least one thrust control vane and said at least one steering control vane.

2. The hovercraft of claim 1, wherein said single control stick is movable along a first path to control the operation of said at least one steering control vane and is movable along a second path to control said at least one thrust control vane.

3. The hovercraft of claim 1, wherein each of said air chambers is defined by a respective pair of vertical dividers, each vertical divider including a stationary portion and a pivoting portion depending therefrom to accommodate variations in the height of the surface over which said hovercraft is passing.

4. The hovercraft of claim 3, wherein at least one opening is provided for each said localized air chamber to permit air to flow from said air distribution chamber to said localized air chamber.

5. The hovercraft of claim 2, further including means for locking said control stick at a desired location along said second path at the option of the operator of said hovercraft.

6. The hovercraft of claim 2, wherein said control stick is coupled to said at least one thrust control vane and to said at least one steering control vane by a transmission mechanism which causes movement of said control stick along said first path to effect only the operation of said at least one steering control vane and which causes movement of said control stick along said second path to effect only the operation of said at least one thrust control vane.

7. The hovercraft of claim 6, wherein said transmission mechanism includes a horizontal axle which translates back and forth in response to movement of said control stick along said first path and rotates about said axis in response to movement of said control stick along said first path and wherein said transmission mechanism responds to the back and forth movement of said horizontal axle by adjusting the angle of said at least one thrust control vane and respond to said rotational movement of said horizontal axis by adjusting the angle of said at least one steering control vane.

* * * * *